US012555542B2

(12) United States Patent
Park et al.

(10) Patent No.: US 12,555,542 B2
(45) Date of Patent: Feb. 17, 2026

(54) ELECTRONIC DEVICE AND METHOD FOR SWAPPING GAMMA VOLTAGE FOR DISCHARGING OF PIXELS

(71) Applicant: Samsung Electronics Co., Ltd., Suwon-si (KR)

(72) Inventors: Hyunjun Park, Suwon-si (KR); Donghwy Kim, Suwon-si (KR); Jongkon Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/913,236

(22) Filed: Oct. 11, 2024

(65) Prior Publication Data

US 2025/0037665 A1 Jan. 30, 2025

Related U.S. Application Data

(63) Continuation of application No. PCT/KR2023/004385, filed on Mar. 31, 2023.

(30) Foreign Application Priority Data

Apr. 20, 2022 (KR) ........................ 10-2022-0049093
Jun. 21, 2022 (KR) ........................ 10-2022-0075736

(51) Int. Cl.
*G09G 3/20* (2006.01)
*G09G 3/3258* (2016.01)

(52) U.S. Cl.
CPC ......... *G09G 3/3258* (2013.01); *G09G 3/2003* (2013.01); *G09G 2320/0276* (2013.01);
(Continued)

(58) Field of Classification Search
CPC ... G09G 2310/0245; G09G 2310/0275; G09G 2310/0297; G09G 2320/0238;
(Continued)

(56) References Cited

U.S. PATENT DOCUMENTS 9,041,746 B2 5/2015 Byun
9,047,823 B2 6/2015 Kim et al.
(Continued)

FOREIGN PATENT DOCUMENTS

CN 102122490 A 7/2011
CN 105185304 A 12/2015
(Continued)

OTHER PUBLICATIONS

International Search Report dated Jul. 3, 2023, issued in International Patent Application No. PCT/KR2023/004385.
(Continued)

*Primary Examiner* — Kenneth Bukowski
(74) *Attorney, Agent, or Firm* — Jefferson IP Law, LLP

(57) ABSTRACT

The disclosure relates to an electronic device and a method for swapping a gamma voltage for discharging of pixels during a repair operation of a display panel. The method includes determining whether a display is in at least one prespecified abnormal state, and performing a display recovery operation, based on determining that the display is in the abnormal state, the display recovery operation including an operation of transitioning the display from an on state to an off state, and an operation of transitioning the display from the off state to the on state, wherein a device driver integrated circuit (IC) (DDI) is controlled to supply a discharge voltage for discharging the voltage of designated nodes included in a plurality of pixels, to a data line of the display before the display transitions from the off state to the on state.

21 Claims, 13 Drawing Sheets

(52) U.S. Cl.
CPC . *G09G 2330/023* (2013.01); *G09G 2330/028* (2013.01); *G09G 2330/08* (2013.01)

(58) Field of Classification Search
CPC ..... G09G 2320/0276; G09G 2330/023; G09G 2330/027; G09G 2330/028; G09G 2330/04; G09G 2330/08; G09G 2330/12; G09G 3/006; G09G 3/2003; G09G 3/3258; G09G 3/3275; G09G 3/3291
See application file for complete search history.

(56) References Cited

U.S. PATENT DOCUMENTS

| | | | | |
|---|---|---|---|---|
| 9,305,483 | B2 * | 4/2016 | Lee | G09G 3/2096 |
| 10,453,389 | B2 | 10/2019 | Dai et al. | |
| 10,522,091 | B2 | 12/2019 | Kwon | |
| 10,964,266 | B2 | 3/2021 | Lee | |
| 11,043,156 | B2 * | 6/2021 | Sung | G09G 3/2096 |
| 11,151,925 | B2 | 10/2021 | Park et al. | |
| 11,189,229 | B2 | 11/2021 | Park et al. | |
| 11,462,172 | B2 | 10/2022 | Park et al. | |
| 2007/0001937 | A1 | 1/2007 | Park et al. | |
| 2008/0170025 | A1 | 7/2008 | Song et al. | |
| 2008/0191976 | A1 | 8/2008 | Nathan et al. | |
| 2012/0176346 | A1 | 7/2012 | Weng | |
| 2012/0242644 | A1 * | 9/2012 | Liu | G09G 3/20 345/212 |
| 2014/0043314 | A1 * | 2/2014 | Park | G09G 3/20 345/212 |
| 2014/0118330 | A1 * | 5/2014 | Lee | G09G 3/2096 345/212 |
| 2015/0145845 | A1 * | 5/2015 | Nam | G09G 3/3233 345/212 |
| 2015/0145898 | A1 | 5/2015 | Hwang et al. | |
| 2016/0275842 | A1 * | 9/2016 | Seok | G09G 3/3233 |
| 2017/0069264 | A1 * | 3/2017 | Dai | G09G 3/3233 |
| 2019/0080653 | A1 * | 3/2019 | Kwon | H10K 59/131 |
| 2019/0147790 | A1 * | 5/2019 | Chung | G09G 3/006 345/213 |
| 2019/0204694 | A1 * | 7/2019 | Wang | G09G 3/3677 |
| 2020/0294457 | A1 * | 9/2020 | Lim | G09G 3/3614 |
| 2021/0183299 | A1 * | 6/2021 | Park | G09G 3/2074 |
| 2021/0398490 | A1 * | 12/2021 | Park | G09G 3/3266 |

FOREIGN PATENT DOCUMENTS

| | | | | |
|---|---|---|---|---|
| KR | 10-2006-0020495 | A | 3/2006 | |
| KR | 10-2060539 | B1 | 12/2019 | |
| KR | 10-2021-0011293 | A | 2/2021 | |
| KR | 10-2021-0076626 | A | 6/2021 | |
| KR | 10-2302451 | B1 | 9/2021 | |
| KR | 10-2021-0149008 | A | 12/2021 | |
| KR | 10-2021-0149512 | A | 12/2021 | |
| KR | 10-2021-0158457 | A | 12/2021 | |
| KR | 10-2022-0009360 | A | 1/2022 | |
| WO | WO-2022037495 | A1 * | 2/2022 | G06F 11/0706 |

OTHER PUBLICATIONS

European Search Report dated Apr. 24, 2025, issued in European Application No. 23792059.0.

* cited by examiner

ELECTRONIC DEVICE AND METHOD FOR SWAPPING GAMMA VOLTAGE FOR DISCHARGING OF PIXELS

CROSS-REFERENCE TO RELATED APPLICATION(S)

This application is a continuation application, claiming priority under § 365 (c), of an International application No. PCT/KR2023/004385, filed on Mar. 31, 2023, which is based on and claims the benefit of a Korean patent application number 10-2022-0049093, filed on Apr. 20, 2022, in the Korean Intellectual Property Office, and of a Korean patent application number 10-2022-0075736, filed on Jun. 21, 2022, in the Korean Intellectual Property Office, the disclosure of each of which is incorporated by reference herein in its entirety.

BACKGROUND

1. Field

The disclosure relates to an electronic device and a method for swapping a gamma voltage to discharge a pixel in a recovery operation of a display panel.

2. Description of Related Art

An electronic device may display various screens including an image, text, or the like through a display panel (or display). Each pixel of the display panel may include an organic light-emitting diode (OLED) and a pixel circuit that drives the OLED.

The electronic device may monitor the state of the display panel, and may perform a recovery operation of the display panel when the display panel is in an abnormal state. In the recovery operation of the display panel, the electronic device may cut off power supplied to the display panel and then supply power again. For example, the electronic device may turn off an electroluminescent voltage drain drain (ELVDD) voltage and an electroluminescent voltage source source (ELVSS) voltage, which are power supplied to the display panel, and then turn on the ELVDD voltage and the ELVSS voltage again.

The above information is presented as background information only to assist with an understanding of the disclosure. No determination has been made, and no assertion is made, as to whether any of the above might be applicable as prior art with regard to the disclosure.

SUMMARY

The power consumption of a display panel varies depending on the manufacturer of the display panel. When an electronic device having a display panel with relatively high power consumption performs a recovery operation of the display panel, there may be a delay in discharging charges from at least some nodes of a pixel circuit that drives an OLED. When the electronic device resupplies power to the display panel in a state in which charges are not adequately discharged from at least some nodes of the pixel circuit that drives the OLED, the electronic device may malfunction due to charges remaining in the nodes. The malfunction of the electronic device may include a phenomenon in which a black screen is displayed as floating, screen flickering, or a shutdown of a power management integrated circuit (PMIC)

Aspects of the disclosure are to address at least the above-mentioned problems and/or disadvantages and to provide at least the advantages described below. Accordingly, an aspect of the disclosure is to provide an electronic device and a method for swapping a gamma voltage to discharge a pixel in a recovery operation of a display panel.

Additional aspects will be set forth in part in the description which follows and, in part, will be apparent from the description, or may be learned by practice of the presented embodiments.

In accordance with an aspect of the disclosure, an electronic device is provided. The electronic device includes a display connected to an electroluminescent voltage drain drain (ELVDD) line to which a specified first voltage is applied and an electroluminescent voltage source source (ELVSS) line to which a specified second voltage is applied, the display including a plurality of pixels configured to output light corresponding to a data signal input through a data line, a device driver integrated circuit (IC) (DDI) configured to drive the display, memory storing one or more computer programs, and one or more processors communicatively coupled to the memory, the display, and the DDI, wherein the one or more computer programs include computer-executable instructions that, when executed by the one or more processors individually or collectively, cause the electronic device to determine whether the display is in at least one prespecified abnormal state, perform a display recovery operation, based on determining that the display is in the abnormal state, the display recovery operation including an operation of transitioning the display from an on state to an off state and an operation of transitioning the display from the off state to the on state, and control the DDI to supply a discharge voltage for discharging a voltage of a specified node included in each of the plurality of pixels to the data line before the display transitions from the off state to the on state.

In accordance with another aspect of the disclosure, a method of an electronic device is provided. The method includes determining whether a display is in at least one prespecified abnormal state, and performing a display recovery operation, based on determining that the display is in the abnormal state, the display recovery operation including an operation of transitioning the display from an on state to an off state and an operation of transitioning the display from the off state to the on state, wherein a DDI is controlled to supply a discharge voltage for discharging a voltage of a specified node included in each of the plurality of pixels to a data line of the display before the display transitions from the off state to the on state.

In accordance with another aspect of the disclosure, one or more non-transitory computer-readable storage media storing computer-executable instructions that, when executed by a processor individually or collectively, cause an electronic device to perform operations are provided. The operations include determining whether a display is in at least one prespecified abnormal state, and performing a display recovery operation, based on determining that the display is in the abnormal state, the display recovery operation including an operation of transitioning the display from an on state to an off state, and an operation of transitioning the display from the off state to the on state, wherein a DDI is controlled to supply a discharge voltage for discharging a voltage of a specified node included in each of the plurality of pixels to a data line of the display before the display transitions from the off state to the on state.

An electronic device and a method according to various embodiments of the disclosure may swap a gamma voltage to discharge a pixel in a recovery operation of a display panel, thereby quickly discharging charges from at least some nodes of a pixel circuit and preventing the electronic device from malfunctioning.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in comprehensive understanding of various embodiments of the disclosure as defined by the claims and equivalents. It includes various specific details to assist in that understanding but these are to be regarded merely as exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and the claims are not limited to the bibliographical meanings, but, are merely used by the inventor to enable clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a”, “an”, and “the” include plural referents unless the context clearly dictates otherwise. Thus, for example, reference to “a component surface” includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
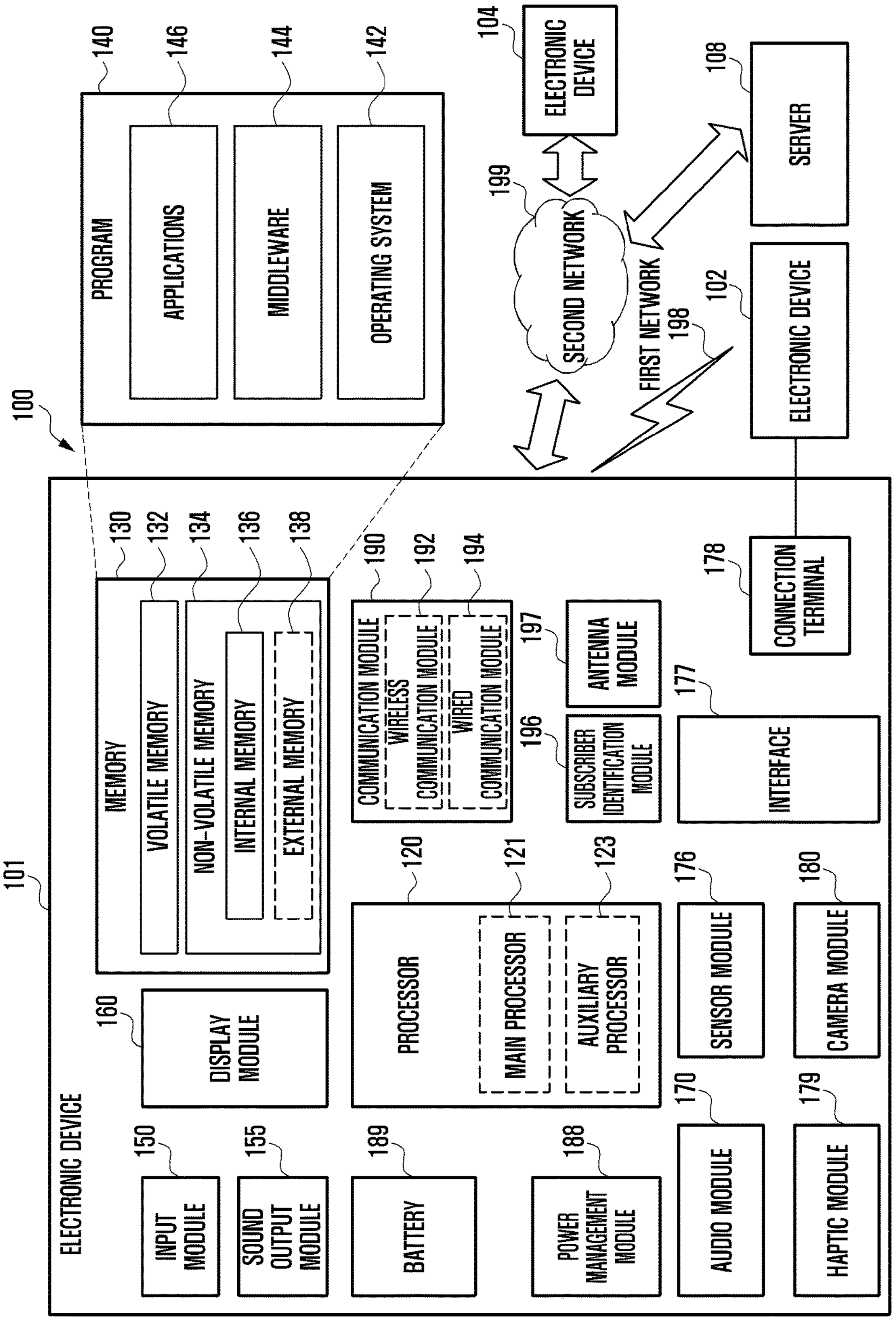
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of the same type as, or a different type, from the electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
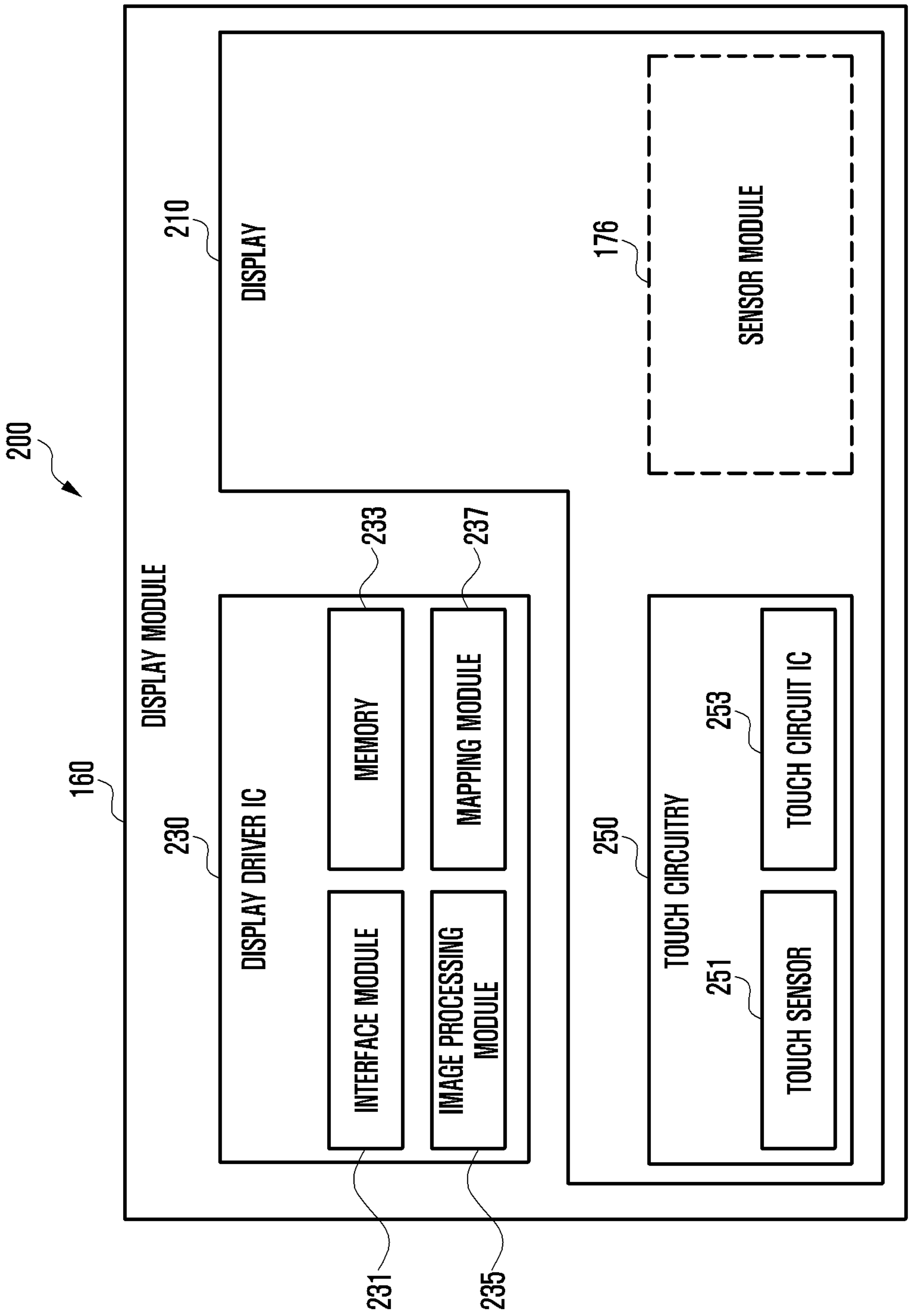
FIG. 2 is a block diagram of a display module according to an embodiment of the disclosure.

FIG. 2 is a block diagram 200 of a display module according to an embodiment of the disclosure.

Referring to FIG. 2, the display module 160 may include a display 210 and a display driver integrated circuit (IC) (DDI) 230 configured to control the display module 160. The DDI 230 may include an interface module 231, memory 233 (e.g., buffer memory 350), an image processing module 235, or a mapping module 237. The DDI 230 may receive, for example, image data or image information including an image control signal corresponding to a command to control the image data from another component of the electronic device 101 through the interface module 231. For example, according to an embodiment of the disclosure, the image information may be received from the processor 120 (e.g., a main processor 121 (e.g., an application processor) or an auxiliary processor 123 (e.g., a graphic processing device) operating independently of the function of the main processor 121). The DDI 230 may communicate with a touch circuit 250 or a sensor module 176 through the interface module 231. Further, the DDI 230 may store at least some of the received image information in the memory 233, for example, by a unit of a frame. The image processing module 235 may perform preprocessing or postprocessing (e.g., resolution, brightness, or size adjustment), for example, on at least some of the image data, based on at least a characteristic of the image data or a characteristic of the display 210. The mapping module 237 may generate a voltage value or a current value corresponding to the image data preprocessed or postprocessed through the image processing module 135. According to an embodiment of the disclosure, generation of the voltage value or the current value may be performed, for example, at least partly based on a property of pixels (e.g., the arrangement (RGB stripe or Pentile structure) of the pixels or the size of each subpixel) of the display 210. At least some of the pixels of the display 210 may be driven, for example, at least partly based on the voltage value or the current value, thereby displaying visual information (e.g., text, an image, or an icon) corresponding to the image data on the display 210.

According to an embodiment of the disclosure, the display module 160 may further include a touch circuit 250. The touch circuit 250 may include a touch sensor 251 and a touch sensor IC 253 configured to control the touch sensor 251. The touch sensor IC 253 may control the touch sensor 251 to detect, for example, a touch input or a hovering input to a specific position on the display 210. For example, the touch sensor IC 253 may measure a change in a signal (e.g., a voltage, the amount of light, resistance, or the amount of charge) at the specific position of the display 210, thereby detecting the touch input or the hovering input. The touch sensor IC 253 may provide information (e.g., location, area, pressure, or time) about the detected touch input or hovering input to the processor 120. According to an embodiment of the disclosure, at least a part (e.g., the touch sensor IC 253) of the touch circuit 250 may be included as a part of the display driver IC 230 or the display 210 or as a part of another component (e.g., the auxiliary processor 123) disposed outside the display module 160.

According to an embodiment of the disclosure, the display module 160 may further include at least one sensor (e.g., a fingerprint sensor, an iris sensor, a pressure sensor, or an illuminance sensor) of the sensor module 176 or a control circuit therefor. In this case, the at least one sensor or the control circuit therefor may be embedded in a part (e.g., the display 210 or the DDI 230) of the display module 160 or a part of the touch circuit 250. For example, when the sensor module 176 embedded in the display module 160 includes a biometric sensor (e.g., the fingerprint sensor), the biometric sensor may obtain biometric information (e.g., a fingerprint image) associated with a touch input through a partial area of the display 210. In another example, when the sensor module 176 embedded in the display module 160 includes the pressure sensor, the pressure sensor may obtain pressure information associated with a touch input through a partial area or the entire area of the display 210. According to an embodiment of the disclosure, the touch sensor 251 or the sensor module 176 may be disposed between pixels of a pixel layer of the display 210, or above or below the pixel layer.

Figure 3:
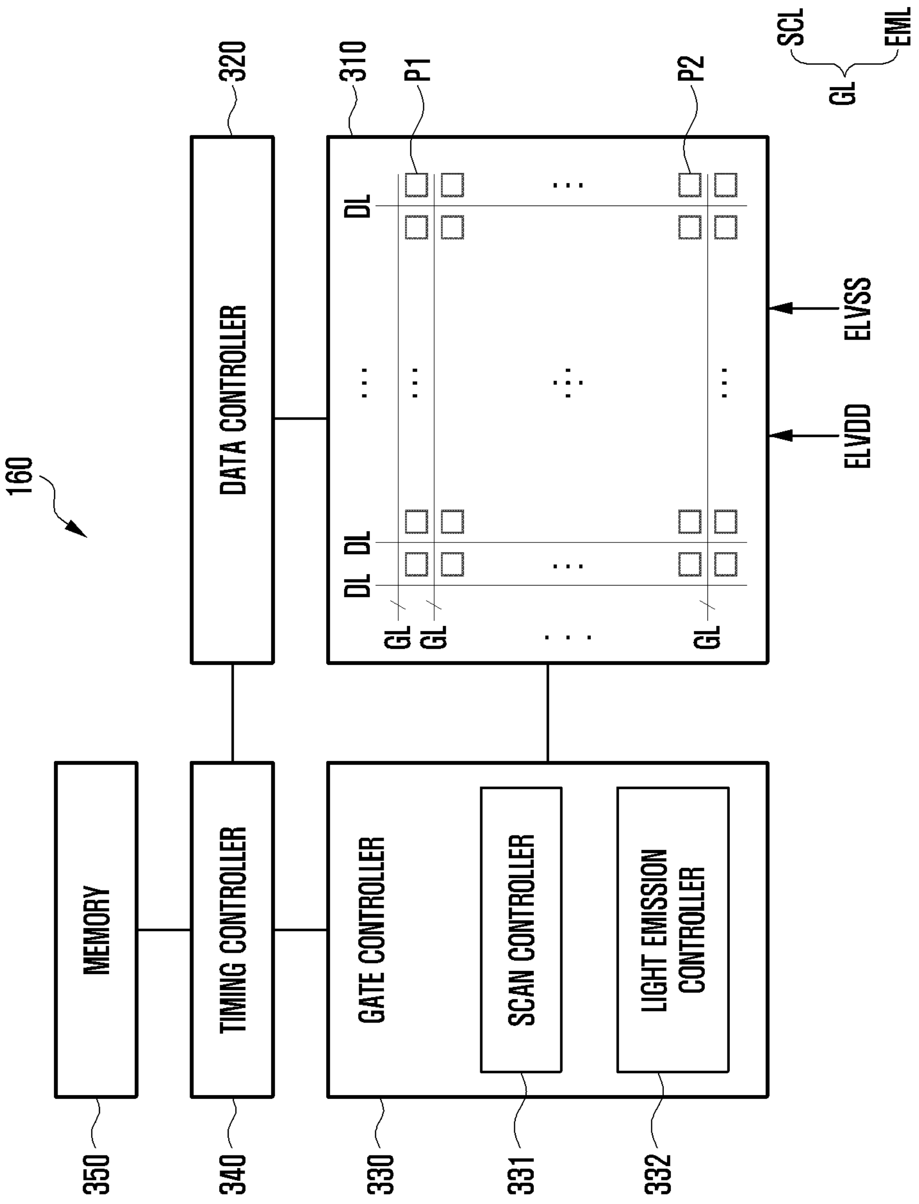
FIG. 3 is a block diagram of a display module according to an embodiment of the disclosure.

FIG. 3 is a block diagram of a display module according to an embodiment of the disclosure.

Referring to FIG. 3, the display module 160 may include an embodiment at least partly similar to or different from the display module 160 illustrated in FIG. 1 and/or FIG. 2. Hereinafter, features of the display module 160 that are not described or different will be described with reference to FIG. 3.

Referring to FIG. 3, the display module 160 according to an embodiment may include a display panel 310, a data controller 320, a gate controller 330, a timing controller 340, and/or memory 350 (e.g., dynamic random access memory (DRAM)).

According to various embodiments of the disclosure, at least some of the data controller 320, the gate controller 330, the timing controller 340, and/or the memory 350 (e.g., the dynamic random access memory (DRAM)) may be included in a DDI 230 (e.g., the DDI 230 of FIG. 2). According to an embodiment of the disclosure, the data controller 320, the timing controller 340, and/or the memory 350 (e.g., the dynamic random access memory (DRAM)) may be included in the DDI 230 (e.g., the DDI 230 of FIG. 2), and the gate controller 330 may be disposed in a non-display area (not shown) of the display panel 310.

According to an embodiment of the disclosure, the display panel 310 may include a plurality of gate lines GL and a plurality of data lines DL. According to an embodiment of the disclosure, the plurality of gate lines GL may be formed, for example, in a first direction (e.g., a horizontal direction in FIG. 3) and disposed at a specified interval. According to an embodiment of the disclosure, the plurality of data lines DL may be formed, for example, in a second direction (e.g., a vertical direction in FIG. 3) perpendicular to the first direction and disposed at a specified interval. In various embodiments of the disclosure, the "scan direction of the display panel 310" may be defined as a direction perpendicular to the direction in which the gate lines GL are formed. For example, when the plurality of gate lines GL are formed in the first direction (e.g., the horizontal direction in FIG. 3), the scan direction of the display panel 310 may be defined as the second direction (e.g., the vertical direction in FIG. 3) perpendicular to the first direction.

According to an embodiment of the disclosure, a pixel P may be disposed in each of some areas of the display panel 310 where the plurality of gate lines GL and the plurality of data lines DL intersect. According to an embodiment of the disclosure, each pixel P may be electrically connected to the gate lines GL and the data lines DL to display a specified grayscale.

According to an embodiment of the disclosure, each pixel P may receive a scan signal and a light-emitting signal through the gate lines GL, and may receive a data signal through the data lines DL. According to an embodiment of the disclosure, each pixel P may receive a high-potential voltage (e.g., an ELVDD voltage) and a low-potential voltage (e.g., an ELVSS voltage) as power for driving an organic light-emitting diode (OLED).

According to an embodiment of the disclosure, each pixel P may include an OLED and a pixel driving circuit (not shown) configured to drive the OLED. According to various embodiments of the disclosure, the structure of each pixel P and the structure of the pixel driving circuit may be at least partly similar to or the same as the structure of the pixel P and the pixel driving circuit disclosed in Korean Patent Registration No. 10-2189223. According to an embodiment of the disclosure, the pixel driving circuit disposed in each pixel P may control the OLED to be turned on (e.g., activated) or off (e.g., deactivated), based on a scan signal and a light-emitting signal. According to an embodiment of the disclosure, when the OLED of each pixel P is turned on (e.g., activated), the OLED may display a grayscale (e.g., brightness) corresponding to a data signal for a one-frame period.

According to an embodiment of the disclosure, the data controller 320 may drive the plurality of data lines DL. According to an embodiment of the disclosure, the data controller 320 may receive at least one synchronization signal and a data signal (e.g., digital image data) from the timing controller 340 or the processor 120 (e.g., the processor 120 of FIG. 1). According to an embodiment of the disclosure, the data controller 320 may determine a data voltage (e.g., analog image data) corresponding to the input data signal by using a reference gamma voltage and a specified gamma curve. According to an embodiment of the disclosure, the data controller 320 may apply the data voltage to the plurality of data lines DL, thereby supplying the data voltage to each pixel P.

According to an embodiment of the disclosure, the gate controller 330 may drive the plurality of gate lines GL. According to an embodiment of the disclosure, the gate controller 330 may receive at least one synchronization signal from the timing controller 340 or the processor 120 (e.g., the processor 120 of FIG. 1). According to an embodiment of the disclosure, the gate controller 330 may include a scan controller 331 configured to sequentially generate a plurality of scan signals, based on the synchronization signal and to supply the plurality of generated scan signals to the gate lines GL. According to an embodiment of the disclosure, the gate controller 330 may further include a light emission controller 332 configured to sequentially generate a plurality of light emission signals, based on the synchronization signal and to supply the plurality of generated light emission signals to the gate lines GL. For example, each gate line GL may include a scan signal line SCL to which a scan signal is applied and/or a light emission signal line EML to which a light emission signal is applied.

According to an embodiment of the disclosure, the timing controller 340 may control the driving timing of the gate controller 330 and the data controller 320. According to an embodiment of the disclosure, the timing controller 340 may obtain a one-frame amount of a data signal (e.g., digital image data). According to an embodiment of the disclosure, the timing controller 340 may receive the one-frame amount of the data signal from the processor 120. According to an embodiment of the disclosure, the timing controller 340 may refer to the memory 350 (e.g., the DRAM) that stores a data signal of a previous frame to control an image of the previous frame to be displayed on at least a portion of the display panel 310, based on a specified event.

According to an embodiment of the disclosure, the timing controller 340 may convert the obtained data signal (e.g., the digital image data) to correspond to the resolution of the display panel 310, and may supply the converted data signal to the data controller 320.

Figure 4:
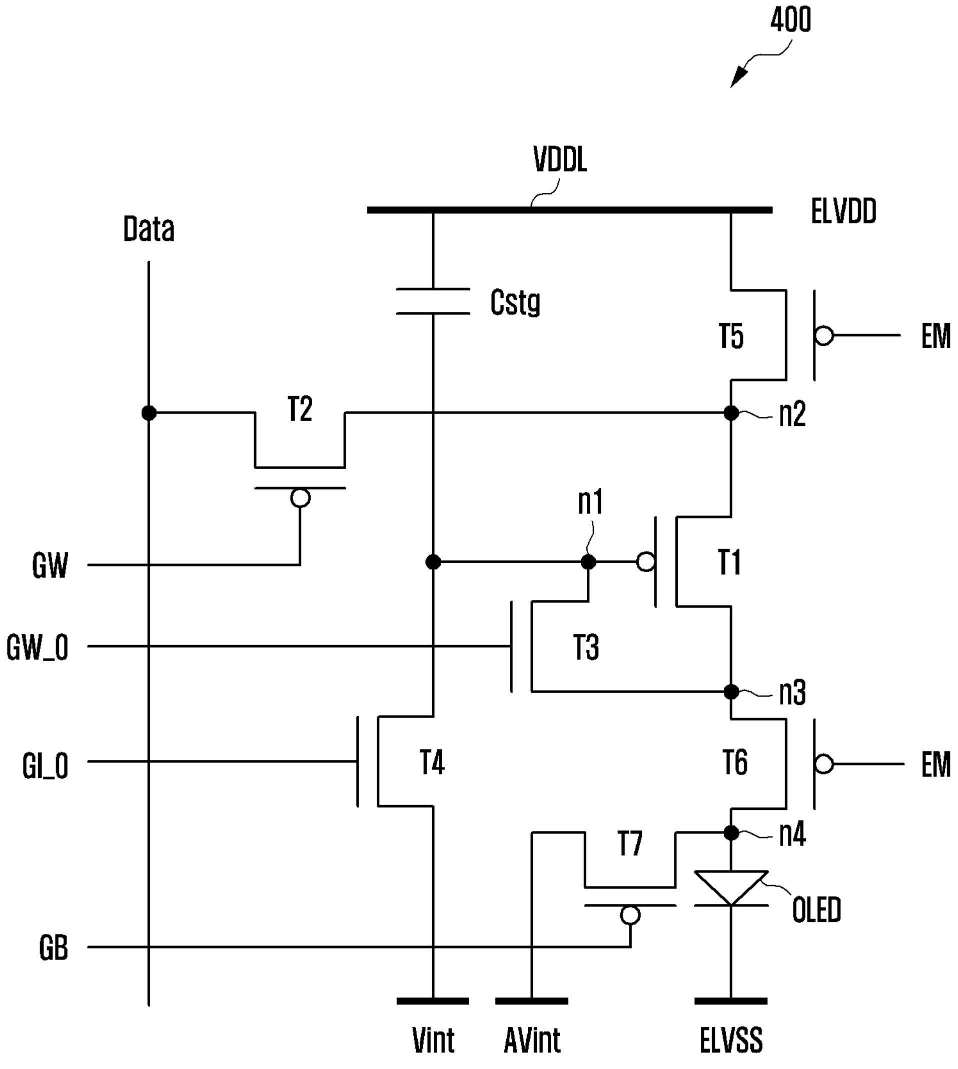
FIG. 4 is a circuit diagram illustrating a pixel driving circuit of each pixel according to an embodiment of the disclosure.

FIG. 4 illustrates a pixel driving circuit of each pixel according to an embodiment of the disclosure.

Referring to FIG. 4, a pixel driving circuit 400 of each pixel (e.g., the pixel P of FIG. 3) of a display panel (e.g., the display panel 310 of FIG. 3) according to an embodiment may include an OLED and a plurality of thin-film transistors (TFTs) configured to drive the OLED.

According to an embodiment of the disclosure, each pixel P may include a first TFT T1, a second TFT T2, a third TFT T3, a fourth TFT T4, a fifth TFT T5, a sixth TFT T6, a seventh TFT T7, and a storage capacitor Cstg.

According to various embodiments of the disclosure, each of the first to seventh TFTs T1, T2, T3, T4, T5, T6, and T7 may be either a PMOS transistor or an NMOS transistor.

According to various embodiments of the disclosure, the first to seventh TFTs T1, T2, T3, T4, T5, T6, and T7 may be configured as one of a low-temperature poly silicon (LTPS) TFT, an oxide TFT, or a low-temperature polycrystalline oxide (LTPO) TFT.

According to an embodiment of the disclosure, the first TFT T1 may supply a specified current to the OLED, based on a data voltage Data input through a data line (e.g., the data lines DL of FIG. 3). The first TFT T1 may be referred to as a driving TFT. In the following example, a gate of the first TFT T1 is defined as a first node n1, a source of the first TFT T1 is defined as a second node n2, and a drain of the first TFT T1 is defined as a third node n3.

According to an embodiment of the disclosure, the second TFT T2 may switch a connection between the data line DL to which the data voltage Data is supplied and the source (i.e., the second node n2) of the first TFT T1, based on a first gate signal GW. For example, the second TFT T2 may be turned on in response to the first gate signal GW, and may electrically connect the data line DL and the source (i.e., the second node n2) of the first TFT T1 when turned on.

According to an embodiment of the disclosure, the third TFT T3 may switch a connection between the gate (i.e., the first node n1) of the first TFT T1 and the drain (i.e., the third node n3) of the first TFT T1, based on a second gate signal GW_O. For example, the third TFT T3 may be turned on in response to the second gate signal GW_O, and may electrically connect the gate (i.e., the first node n1) of the first TFT T1 and the drain (i.e., the third node n3) of the first TFT T1 when turned on.

According to an embodiment of the disclosure, the fourth TFT T4 may supply a first initialization voltage Vint to the gate of the first TFT T1, based on a third gate signal GI_O. For example, the fourth TFT T4 may be turned on in response to the third gate signal GI_O, and may supply the first initialization voltage Vint to the gate (i.e., the first node n1) of the first TFT T1 to thereby initialize the gate (i.e., the first node n1) of the first TFT T1 when turned on.

According to an embodiment of the disclosure, the fifth TFT T5 may switch a connection between an ELVDD line VDDL to which an ELVDD voltage is supplied and the source (i.e., the second node n2) of the first TFT T1, based on a light emission signal EM. For example, the fifth TFT T5 may be turned on in response to the light emission signal EM, and may supply the ELVDD voltage to the source (i.e., the second node n2) of the first TFT T1 when turned on.

According to an embodiment of the disclosure, the sixth TFT T6 may connect the drain (i.e., the third node n3) of the first TFT T1 and an anode (e.g., a fourth node n4) of the OLED, based on a light emission signal EM. For example, the sixth TFT T6 may be turned on in response to the light emission signal EM, and may electrically connect the drain (i.e., the third node n3) of the first TFT T1 and the anode (e.g., the fourth node n4) of the OLED when turned on.

According to an embodiment of the disclosure, the seventh TFT T7 may supply a second initialization voltage A Vint to the anode (e.g., the fourth node n4) of the OLED, based on a fourth gate signal GB. For example, the seventh TFT T7 may be turned on in response to the fourth gate signal GB, and may supply the second initialization voltage AVint to the anode (e.g., the fourth node n4) of the OLED to thereby initialize the OLED when turned on.

According to an embodiment of the disclosure, a storage capacitor Cstg may be disposed between the gate (i.e., the first node n1) of the first TFT T1 and the ELVDD line VDDL to which the ELVDD voltage is supplied. The storage capacitor Cstg may store the data voltage Data supplied to the gate (i.e., the first node n1) of the first TFT T1 for a one-frame period.

The power consumption of the display panel 310 varies depending on the manufacturer of the display panel 310. In a case where an electronic device 101 includes the display panel 310 having relatively high power consumption, when performing a recovery operation of the display panel, discharge of charges may be delayed in at least some nodes (e.g., the third node n3 and/or the fourth node n4) of the pixel driving circuit 400 that drives the OLED. When the electronic device 101 resupplies power (e.g., ELVDD and ELVSS) to the display panel 310 in a state in which charges are not adequately discharged from at least some nodes (e.g., the third node n3 and/or the fourth node n4) of the pixel driving circuit 400 that drives the OLED, the electronic device 101 may malfunction due to charges remaining in the nodes (e.g., the third node n3 and/or the fourth node n4). The malfunction of the electronic device 101 may include a phenomenon in which a black screen is displayed as floating, screen flickering, or a shutdown of a power management integrated circuit (PMIC) (not shown). In the electronic device 101 according to various embodiments of the disclosure may include a DDI that includes a gamma voltage swapping function to quickly discharge charges from at least some nodes (e.g., the third node n3 and/or the fourth node n4) of the pixel driving circuit 400 when performing a recovery operation of the display panel.

Figure 5:
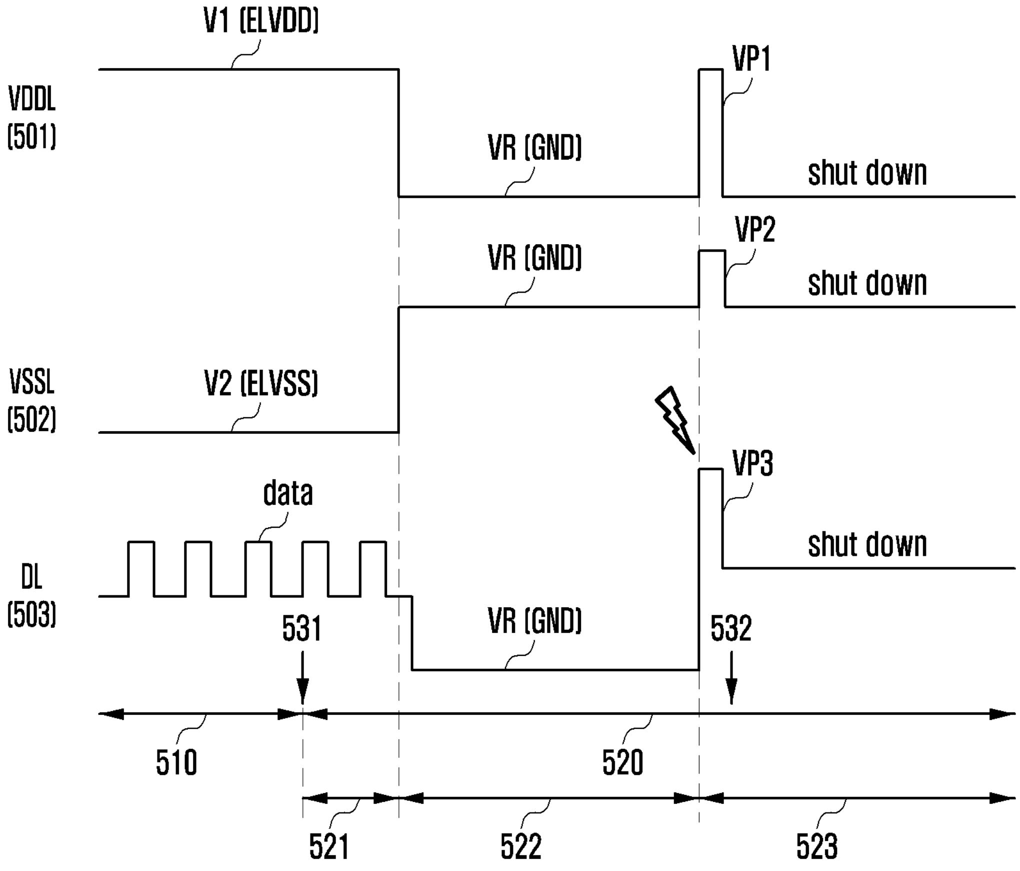
FIG. 5 is a signal waveform diagram illustrating a recovery operation of a display panel according to an embodiment of the disclosure.

FIG. 5 is a signal waveform diagram illustrating a recovery operation of a display panel according to an embodiment of the disclosure.

Referring to FIG. 5, 501 may be a waveform diagram showing the state of a voltage applied to an ELVDD line 501 of the display panel 310.

Referring to FIG. 5, 502 may be a waveform diagram showing the state of a voltage state to an ELVSS line 502 of the display panel 310.

Referring to FIG. 5, 503 may be a waveform diagram showing the state of a voltage applied to a data line DL of the display panel 310.

Referring to FIG. 5, 510 may indicate a period in which a display 160 is in a normal state. According to an embodiment of the disclosure, a processor 120 may monitor the state of the display 160 in the normal state. In the normal state, the processor 120 may control a PMIC 710 to apply an ELVDD voltage, which is a specified first voltage V1, and apply an ELVSS voltage, which is a specified second voltage V2, to an ELVSS line 502. In the normal state, the processor 120 may control a DDI 230 to apply a data voltage to a data line DL. The processor 120 may determine whether the state of the display 160 is at least one prespecified abnormal state. The abnormal state may include a state in which the processor 120 detects an abnormal peak voltage from an external terminal (not shown) of the display panel 310. The abnormal state may include a state in which the processor 120 detects an electrostatic discharge from at least a portion of the display panel 310.

Referring to reference numeral 531, in a normal state, the processor 120 may determine that the state of the display 160 is the at least one prespecified abnormal state, and may perform a recovery operation, based on the determination.

Referring to FIG. 5, 520 may refer to a period in which a recovery operation of the display 160 (e.g., a recovery operation of the display panel 310) is performed. The recovery operation of the display 160 may include a first period 521, a second period 522, or a third period 523.

According to an embodiment of the disclosure, in the first period 521, the processor 120 may apply the ELVDD voltage, which is the specified first voltage V1, through the ELVDD line 501 and apply the ELVSS voltage, which is the specified second voltage V2, through the ELVSS line 502, thereby controlling the display 160 to be turned on. The processor 120 may switch from the first period 521 to the second period 522, based on detecting the abnormal state in the first period 521.

According to an embodiment of the disclosure, the processor 120 may turn off the ELVDD voltage and the ELVSS voltage supplied to the display panel 310 in the second period 522. The processor 120 may apply a reference voltage VR to the ELVDD line 501 instead of the ELVDD voltage and apply the reference voltage VR to the ELVSS line 502 instead of the ELVSS voltage, thereby controlling the display 160 to be turned off. In the second period 522, the processor 120 may control the data voltage not to be supplied to the display 160, and accordingly the potential of the data line DL may be the reference voltage VR. The reference voltage VR mentioned in the disclosure may be a ground voltage. According to an embodiment of the disclosure, the processor 120 may maintain the second period 522 for a specified time, and may switch from the second period 522 to the third period 523 after maintaining the second period 522.

According to an embodiment of the disclosure, the processor 120 may apply the ELVDD voltage and the ELVSS voltage to the display panel 310 again in the third period 523. The processor 120 may apply the ELVDD voltage, which is the specified first voltage V1, through the ELVDD line 501 and apply the ELVSS voltage, which is the specified second voltage V2, through the ELVSS line 502, thereby controlling the display 160 to be turned on.

The recovery operation may be an operation of turning off the power of the display 160 for a specified short time (e.g., less than about 100 ms) and then turning on the power. Time for which the screen of the display 160 is turned off and then on by the recovery operation may be shorter than time for which the screen of the display 160 is turned off and then on by a user input. When switching from the second period 522 to the third period 523, a specified node (e.g., a third node n3 and/or a fourth node n4) of each pixel P may not be sufficiently discharged, and may have a floating potential remaining. When the specified node (e.g., the third node n3 and/or the fourth node n4) of each pixel P is not sufficiently discharged at a time 532 of switching from the second period 522 to the third period 523, as indicated by reference numerals VP1, VP2, and VP3, an overcurrent may momentarily flow in the ELVDD line 501, the ELVSS line 502, and the data line DL. The electronic device 101 may experience a malfunction, such as a system shutdown, due to an overcurrent.

Figure 6:
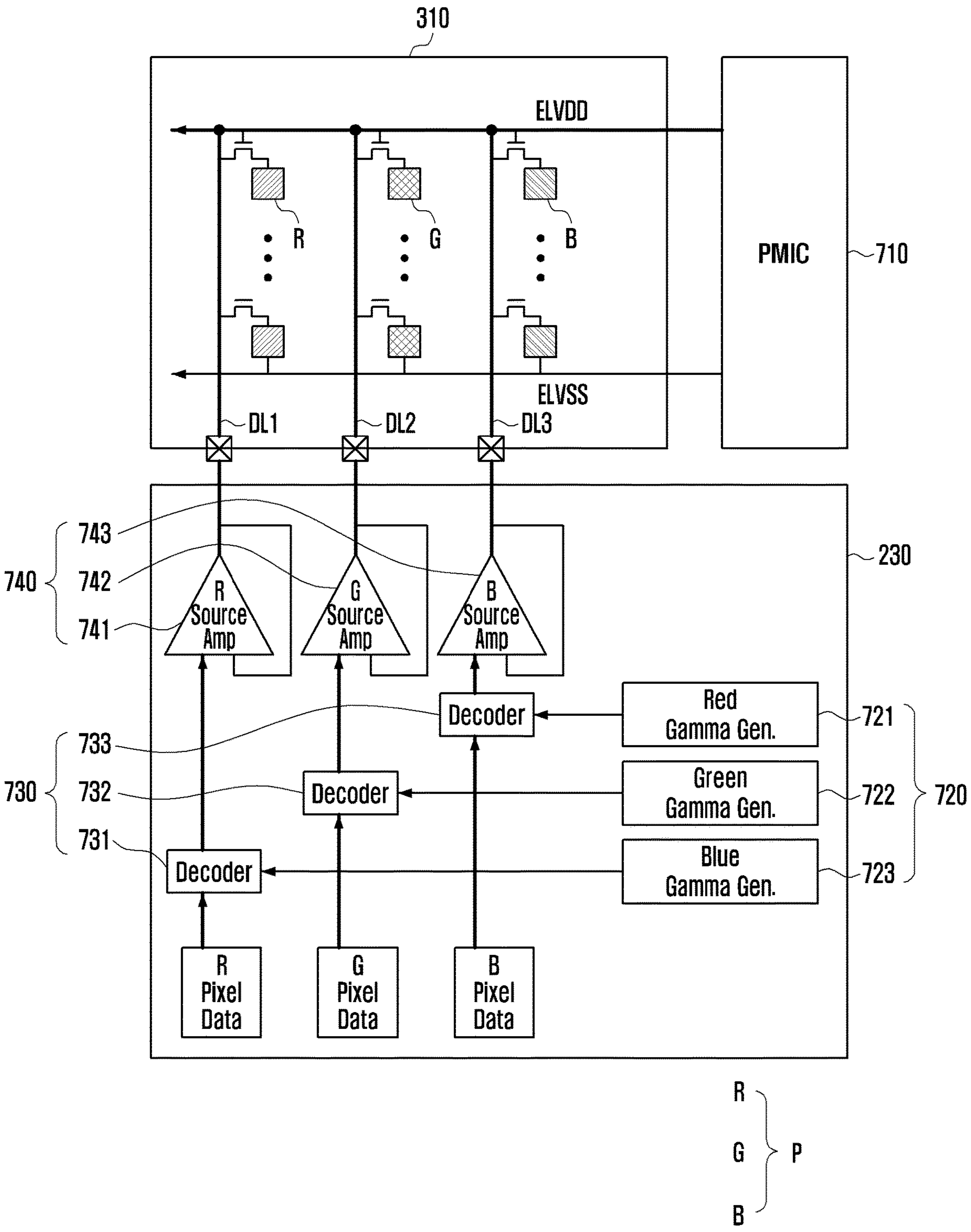
FIG. 6 is a configuration diagram of an electronic device according to a comparative example according to an embodiment of the disclosure.

FIG. 6 is a configuration diagram of an electronic device according to a comparative example according to an embodiment of the disclosure.

Referring to FIG. 6, the electronic device 101 according to the comparative example may include a display panel 310, a PMIC 710 configured to supply an ELVDD voltage and an ELVSS voltage to the display panel 310, or a DDI 230, and these components may be controlled by a processor 120.

The DDI 230 may include a gamma voltage generation unit 720 configured to generate a gamma voltage, a decoder unit 730 configured to convert a digital data signal input from a processor 120 into an analog data signal by using the gamma voltage, or a buffer unit 740 configured to supply the analog data signal output from the decoder unit 730 to each data line DL of a display 160.

The display 160 may include a red pixel R, a green pixel G, or a blue pixel B. The gamma voltage generation unit 720 may include a plurality of gamma generation units 721, 722, and 723 corresponding to each color of a pixel P. For example, the gamma voltage generation unit 720 may include a first gamma generation unit 721 configured to generate a first gamma voltage corresponding to a red color, a second gamma generation unit 722 configured to generate a second gamma voltage corresponding to a green color, or a third gamma generation unit 723 configured to generate a third gamma voltage corresponding to a blue color.

The decoder unit 730 may include a plurality of decoders 731, 732, and 733 corresponding to each color of the pixel P. For example, the decoder unit 730 may include a first decoder 731 configured to generate an analog data voltage supplied to the red pixel R by using the first gamma voltage, a second decoder 732 configured to generate an analog data voltage supplied to the green pixel G by using the second gamma voltage, or a third decoder 733 configured to generate an analog data voltage supplied to the blue pixel B by using the third gamma voltage.

The buffer unit 740 may include a plurality of buffers 741, 742, and 743 corresponding to each color of the pixel P. For example, the buffer unit 740 may include a first buffer 741 configured to receive the analog data voltage output from the first decoder and supply the received analog data voltage to a first data line DL1 connected to the red pixel R, a second buffer 742 configured to receive the analog data voltage output from the second decoder and supply the received analog data voltage to a second data line DL2 connected to the green pixel G, or a third buffer 743) configured to receive the analog data voltage output from the third decoder and supply the received analog data voltage to a third data line DL3 connected to the blue pixel B.

When performing a recovery operation of the display 160, the electronic device 101 according to the comparative example may supply an analog data voltage corresponding to a black grayscale to each pixel P to discharge a specified node (e.g., a third node n3 and/or a fourth node n4) of each pixel P. For example, when performing the recovery operation of the display 160, the electronic device 101 according to the comparative example may control the DDI 230 to supply the analog data voltage (e.g., VB1 of FIG. 7) corresponding to the black grayscale to each pixel P.

Figure 7:
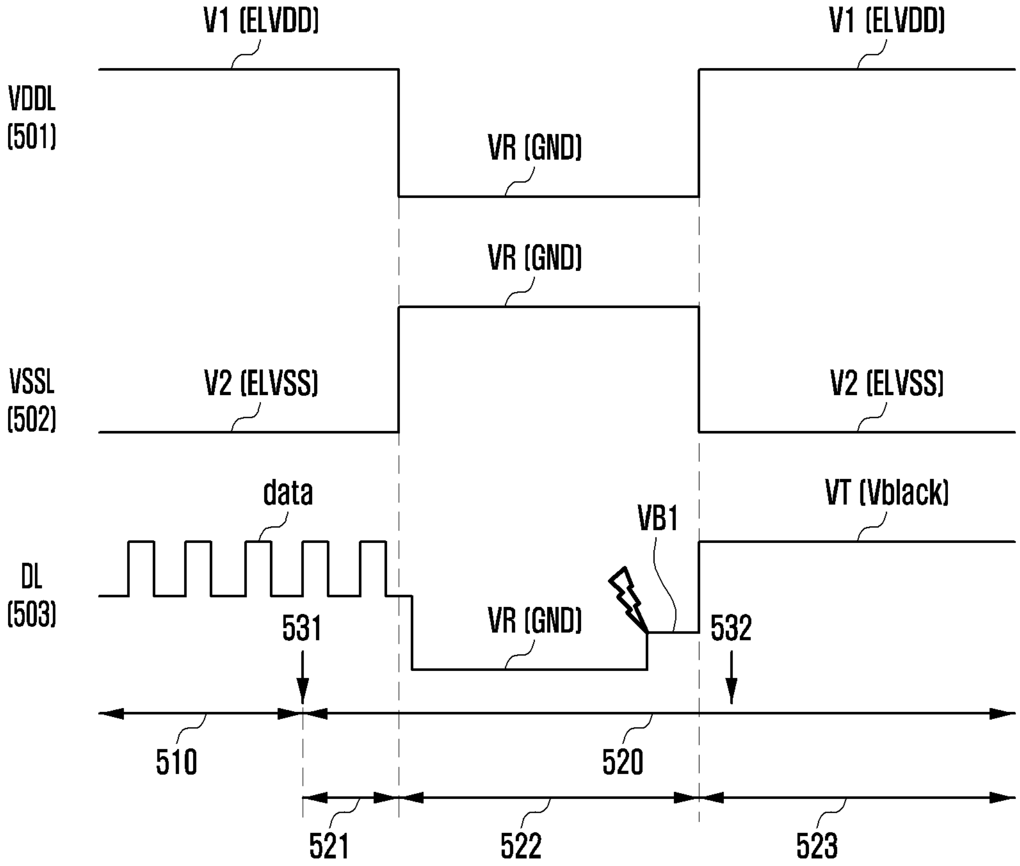
FIG. 7 is a signal waveform diagram illustrating an operation of an electronic device according to a comparative example according to an embodiment of the disclosure.

FIG. 7 is a signal waveform diagram illustrating an operation of an electronic device according to a comparative example according to an embodiment of the disclosure.

Referring to FIG. 7, a recovery operation of a display 160 may be at least partly similar to the recovery operation of the display panel 310 described with reference to FIG. 5. In the comparative example according to FIG. 7, the same reference numerals are given to operations the same as or similar to the recovery operation of the display 160 described with reference to FIG. 5. Therefore, a description of the operations of the same reference numerals as those of FIG. 5 in FIG. 7 will be replaced with content described in FIG. 5.

Referring to FIG. 7, the electronic device 101 according to the comparative example may control a DDI 230 to supply an analog data voltage VB1 corresponding to a black grayscale to each pixel P before the display 160 transitions from an off state to an on state. For example, the electronic device 101 according to the comparative example may control the DDI 230 to supply the analog data voltage VB1 corresponding to the black grayscale to each pixel P during part of a second period 522 before transitioning from the second period 522 to a third period 523.

In the electronic device 101 according to the comparative example, when the DDI 230 supplies the analog data voltage corresponding to the black grayscale to each pixel P, a reference voltage VR other than an ELVDD voltage may be applied through an ELVDD line 501, and the reference voltage VR other than an ELVSS voltage may be applied through an ELVSS line 502, and thus the voltage applied to each pixel P may not reach a target voltage VT corresponding to the black grayscale. When the voltage applied to each pixel P does not reach the target voltage VT corresponding to the black grayscale, a specified node (e.g., a third node n3 and/or a fourth node n4) of each pixel P may not be sufficiently discharged when performing the recovery operation of the display 160, which may cause malfunction, such as an overcurrent and a system shutdown, of the electronic device 101.

Figure 8:
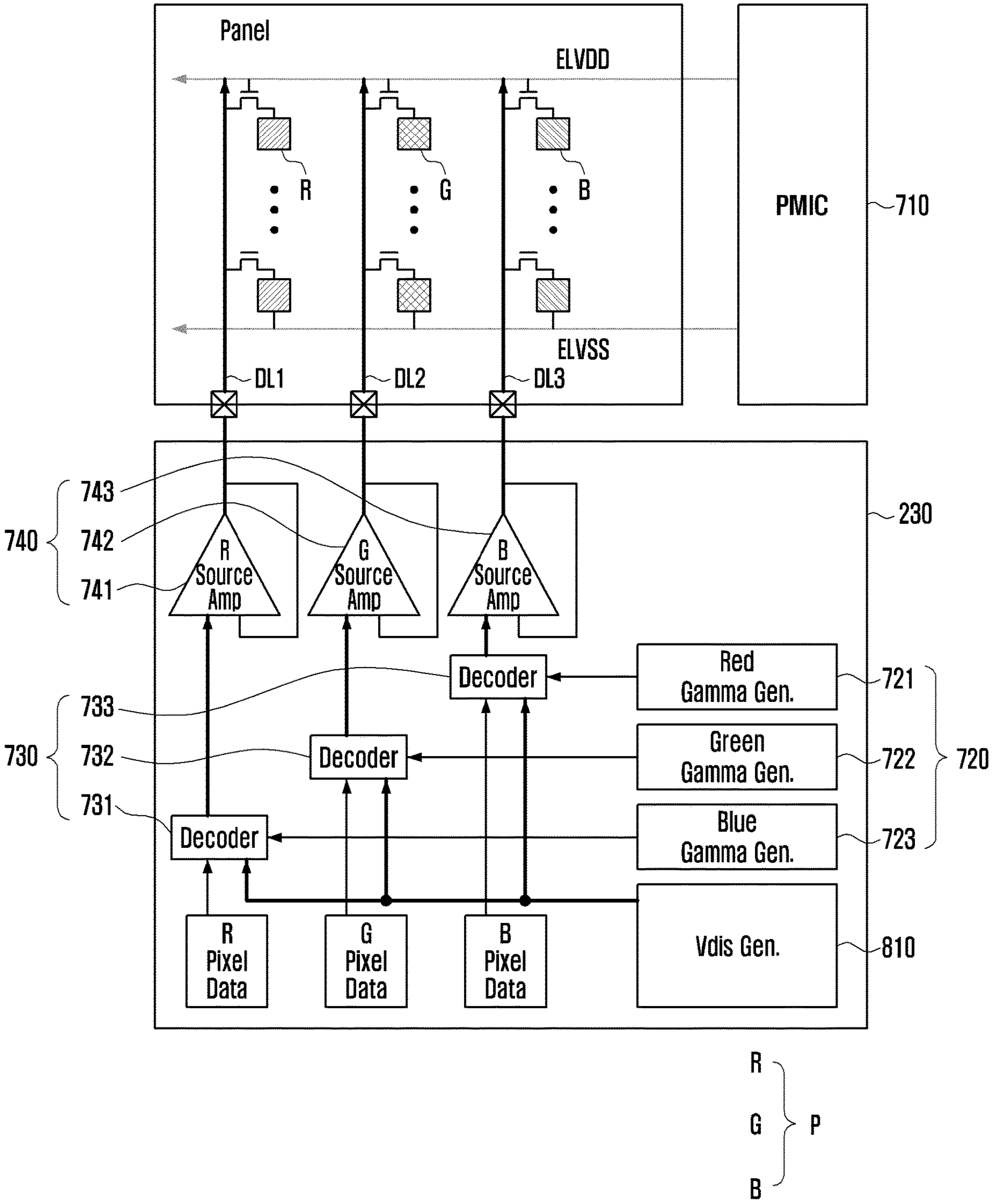
FIG. 8 is a configuration diagram of an electronic device according to an embodiment of the disclosure.

FIG. 8 is a configuration diagram of an electronic device according to an embodiment of the disclosure.

Figure 9:
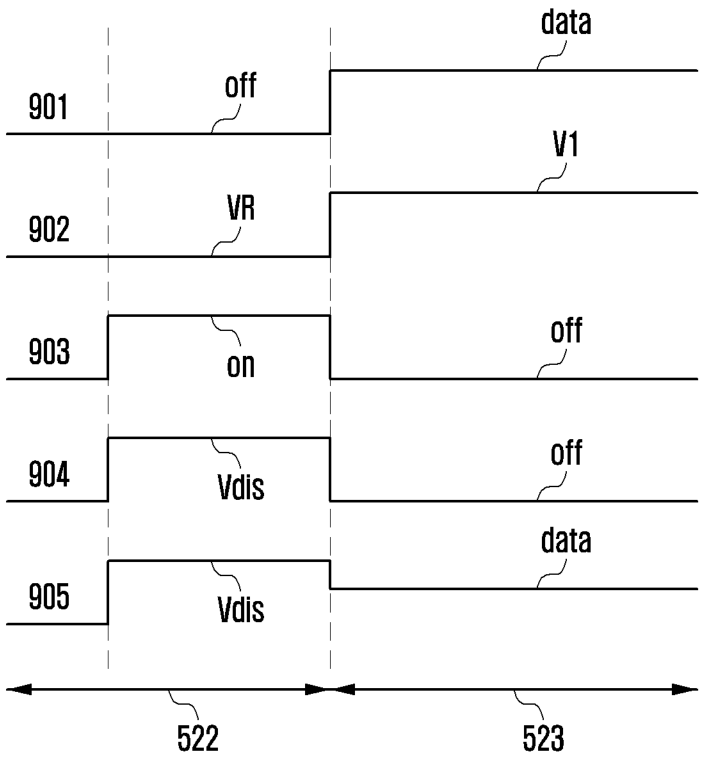
FIG. 9 illustrates a signal timing of an electronic device according to an embodiment of the disclosure.

FIG. 9 illustrates a signal timing of an electronic device according to an embodiment of the disclosure.

Referring to FIGS. 8 and 9, an electronic device 101 according to various embodiments illustrated in FIG. 8 may be at least partly similar to the electronic device 101 illustrated in FIG. 6. In the electronic device 101 according to various embodiments illustrated in FIG. 8, the same reference numerals are given to components the same or similar to those of the electronic device 101 according to the comparative example illustrated in FIG. 6. Therefore, a description of the components of the same reference numerals as those of FIG. 6 in FIG. 8 will be replaced with content described FIG. 6.

Referring to FIGS. 8 and 9, the electronic device 101 according to various embodiments may further include a discharge voltage generation unit 810 in a DDI 230. According to an embodiment of the disclosure, when performing a recovery operation of a display 160, the electronic device 101 may control the discharge voltage generation unit 810 to supply a discharge voltage Vdis to a decoder unit 730. For example, the electronic device 101 according to an embodiment may control the DDI 230 to output the discharge voltage Vdis before the display 160 transitions from an off state to an on state.

According to an embodiment of the disclosure, the discharge voltage Vdis may be a voltage for discharging a specified node (e.g., a third node n3 and/or the fourth node n4) of each pixel P when the electronic device 101 performs a recovery operation of a display panel 310. For example, the discharge voltage Vdis may be a voltage for discharging the specified node (e.g., the third node n3 and/or the fourth node n4) of each pixel P to a potential corresponding to a black grayscale when a reference voltage VR other than an ELVDD voltage is applied through an ELVDD line 501 and the reference voltage VR other than an ELVSS voltage is applied through an ELVSS line 502.

According to an embodiment of the disclosure, the discharge voltage Vdis may be different from an analog data voltage that the DDI 230 outputs to correspond to a black grayscale in a normal state (or the analog data voltage that the electronic device 101 according to the comparative examples of FIGS. 6 and 7 outputs when performing the recovery operation of the display panel 310). For example, the analog data voltage that the DDI 230 outputs to correspond to the black grayscale in the normal state (or the analog data voltage that the electronic device 101 according to the comparative examples outputs when performing the recovery operation of the display panel 310) may be the voltage for displaying the black scale when the ELVDD voltage is applied through the ELVDD line 501 and the ELVSS voltage is applied through the ELVSS line 502, while the discharge voltage Vdis may be a voltage for discharging the specified node (e.g., the third node n3 and/or the fourth node n4) of each pixel P to the potential corresponding to the black grayscale when the reference voltage VR other than the ELVDD voltage is applied through the ELVDD line 501 and the reference voltage VR other than the ELVSS voltage is applied through the ELVSS line 502.

According to an embodiment of the disclosure, when performing the recovery operation of the display panel 310, the electronic device 101 may control the DDI 230 to swap the discharge voltage Vdis supplied to the display 160 through a data line DL with an analog data voltage VB1 corresponding to the black grayscale when the display 160 transitions from the off state to the on state. For example, the electronic device 101 may apply the ELVDD voltage through the ELVDD line 501 and apply the ELVSS voltage through the ELVSS line 502 when switching from a second period 522 to a third period 523. The electronic device 101 may control the DDI 230 to swap the discharge voltage Vdis with the analog data voltage VB1 corresponding to the black grayscale and output the analog data voltage VB1 in synchronization with applying the ELVDD voltage through the ELVDD line 501 and applying the ELVSS voltage through the ELVSS line 502.

According to an embodiment of the disclosure, the discharge voltage Vdis may have a higher potential than the analog data voltage that the DDI 230 outputs to correspond to the black grayscale in the normal state (or the analog data voltage that the electronic device 101 according to the comparative examples of FIGS. 6 and 7 outputs when performing the recovery operation of the display panel 310) considering that the reference voltage other than the ELVDD voltage is applied to the ELVDD line 501.

FIG. 9 may be a waveform diagram illustrating at least a portion of a period in which the electronic device 101 performs the recovery operation of the display panel 310. For example, FIG. 9 illustrates a partial period in which the second period 522 is switched to the third period 523 of the entire period (e.g., 520 of FIG. 5) in which the recovery operation is performed.

Referring to FIG. 9, 901 may indicate an RGB data signal that the DDI 230 receives from a processor 120. The RGB data signal may be input based on a transition from the second period 522 to the third period 523.

Referring to FIG. 9, 902 may be a waveform diagram showing the state of a voltage to the ELVDD line 501. The electronic device 101 may apply the reference voltage VR to the ELVDD line 501 in the second period 522, and may apply the ELVDD voltage, which is a specified first voltage V1, in the third period 523.

Referring to FIG. 9, 903 may indicate a swap synchronization signal. The swap synchronization signal may remain on in at least part of the second period 522 before switching from the second period 522 to the third period 523. The swap sync signal may be switched off in synchronization with the start of the third period 523.

Referring to FIG. 9, 904 may indicate an output voltage of the discharge voltage generation unit 810. The discharge voltage generation unit 810 of the DDI 230 may output the discharge voltage Vdis, based on the swap synchronization signal being on.

Referring to FIG. 9, 905 may be a waveform diagram showing the state of a voltage that the DDI 230 outputs through the data line DL. Referring to 905 of FIG. 9, the DDI 230 may output the discharge voltage Vdis in at least part of the second period 522 before switching from the second period 522 to the third period 523, and may swap the discharge voltage Vdis with the analog data voltage VB1 corresponding to the black grayscale to output the analog data voltage VB1 in synchronization with the start of the third period 523.

Figure 10:
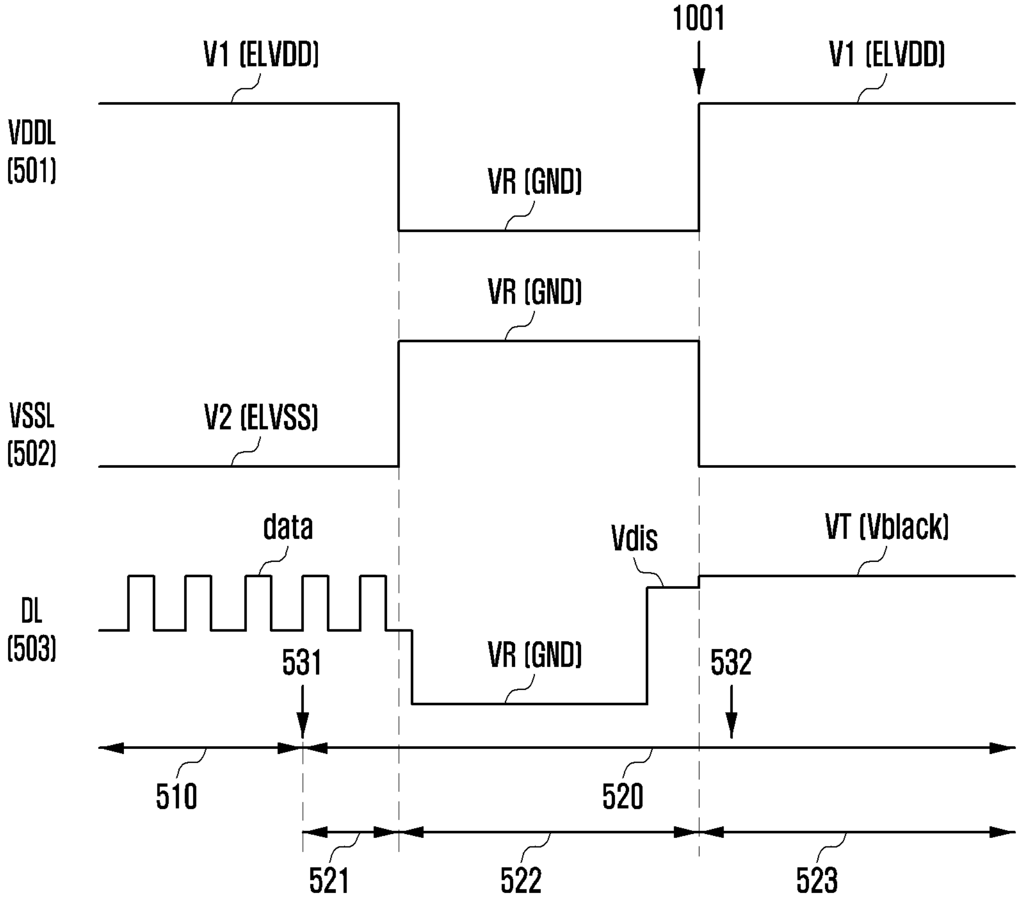
FIG. 10 is a signal waveform diagram illustrating an operation of an electronic device according to an embodiment of the disclosure.

FIG. 10 is a signal waveform diagram illustrating an operation of an electronic device according to an embodiment of the disclosure.

Referring to FIG. 10, a recovery operation of a display 160 may be at least partly similar to the recovery operation of the display panel 310 described with reference to FIG. 5. In various embodiments according to FIG. 10, the same reference numerals are given to operations the same as or similar to the recovery operation of the display 160 described with reference to FIG. 5. Therefore, a description of the operations of the same reference numerals as those of FIG. 5 in FIG. 10 will be replaced with the content described in FIG. 5.

Referring to FIG. 10, the electronic device 101 according to various embodiments may control a DDI 230 to supply a discharge voltage Vdis to each pixel P before the display 160 transitions from an off state to an on state. For example, the electronic device 101 according to the comparative example may control the DDI 230 to supply the discharge voltage Vdis to each pixel P during part of a second period 522 before transitioning from the second period 522 to a third period 523.

The discharge voltage Vdis may be a voltage for discharging a specified node (e.g., a third node n3 and/or the fourth node n4) of each pixel P to a potential corresponding to a black grayscale when a reference voltage VR other than an ELVDD voltage is applied through an ELVDD line 501 and the reference voltage VR other than an ELVSS voltage is applied through an ELVSS line 502. Accordingly, the voltage applied to each pixel P may reach a target voltage VT corresponding to the black grayscale unlike in the comparative example illustrated in FIG. 7. As the voltage applied to each pixel P reaches the target voltage VT corresponding to the black grayscale, the electronic device 101 according to various embodiments may prevent malfunction of the electronic device 101, such as an overcurrent flowing in the pixel P and a system shutdown, when the display 160 switches from the off state to the on state.

The DDI 230 may swap the discharge voltage Vdis with an analog data voltage VB1 corresponding to the black grayscale at a time 1001 when the display 160 transitions from the off state to the on state. For example, the electronic device 101 may apply the ELVDD voltage through the ELVDD line 501 and apply the ELVSS voltage through the ELVSS line 502 when switching from the second period 522 to the third period 523. The electronic device 101 may control the DDI 230 to swap the discharge voltage Vdis with the analog data voltage VB1 corresponding to the black grayscale and output the analog data voltage VB1 in synchronization with applying the ELVDD voltage through the ELVDD line 501 and applying the ELVSS voltage through the ELVSS line 502.

Figure 11:
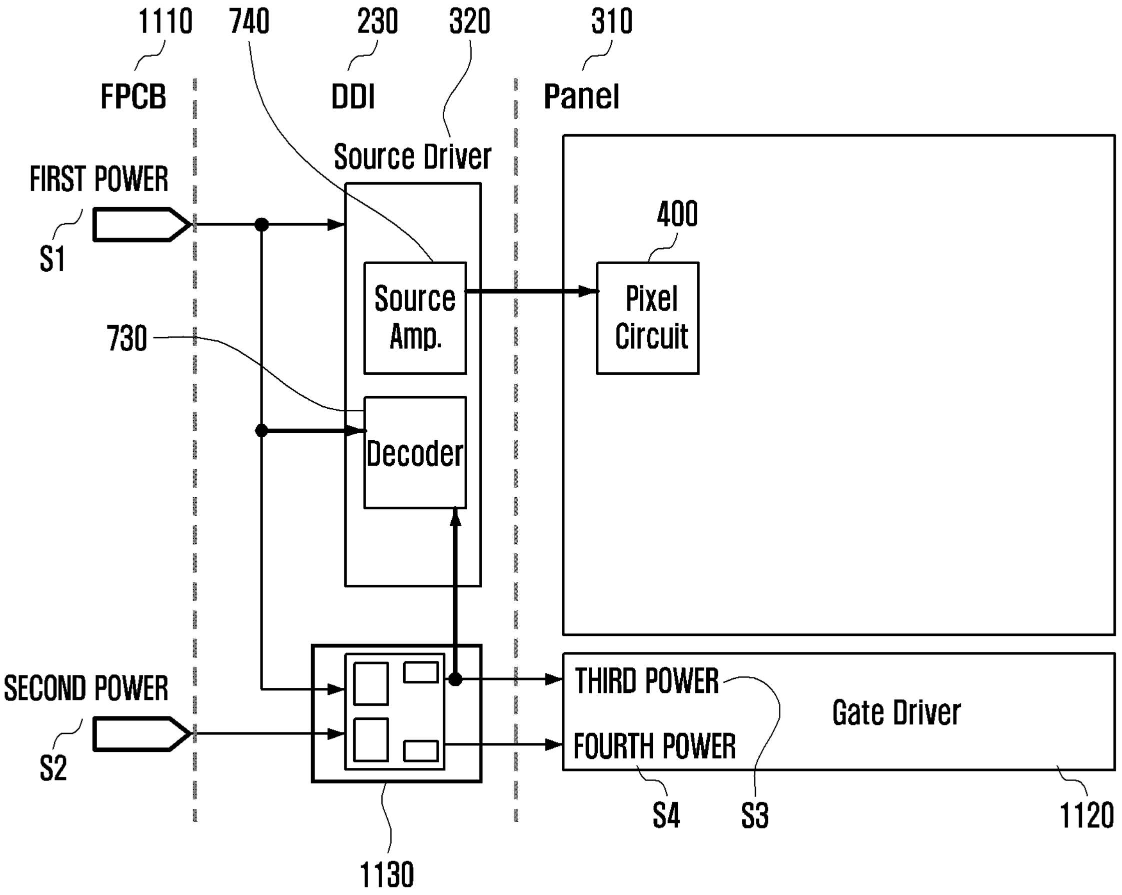
FIG. 11 is a configuration diagram of an electronic device illustrating a method of generating a discharge voltage according to an embodiment of the disclosure.

FIG. 11 is a configuration diagram of an electronic device illustrating a method of generating a discharge voltage Vdis according to an embodiment of the disclosure.

Referring to FIG. 11, a DDI 230 may receive first power S1 or second power S2 through an FPCB 1110. The first power S1 may be supplied to a data controller 320 (e.g., a source driver) and a discharge voltage generation unit 810 of the DDI 230. The second power S2 may be supplied to a charge pump 1130 of the DDI 230.

According to an embodiment of the disclosure, the discharge voltage generation unit 810 may be configured as at least a part of the charge pump 1130 included in the DDI 230. The charge pump 1130 may step up the first power S1 and the second power S2 and regulate a stepped-up voltage, thereby generating a discharge voltage Vdis, third power S3, or fourth power S4. The charge pump 1130 may supply the discharge voltage Vdis to a decoder unit 730, thereby enabling the DDI 230 to supply a black voltage to pixel P regardless of whether an ELVDD voltage is applied to an ELVDD line 501 during a recovery operation of a display panel 310. The charge pump 1130 may supply the third power S3 or the fourth power S4 to a gate controller 1120 (e.g., an LTPS driver 330).

In another embodiment of the disclosure, the discharge voltage generation unit 810 may output the first power S1 received through the FPCB 1110 as a discharge voltage Vdis.

According to an embodiment of the disclosure, the first power S1 may be a voltage of about 7 V, which is only for illustration and may be variously changed.

According to an embodiment of the disclosure, the second power S2 may be a voltage of about 3 V, which is only for illustration and may be variously changed.

According to an embodiment of the disclosure, the third power S3 may be a voltage of about 6.5 V, which is only for illustration and may be variously changed.

According to an embodiment of the disclosure, the fourth power S4 may be a voltage of about-7 V, which is only for illustration and may be variously changed.

Figure 12:
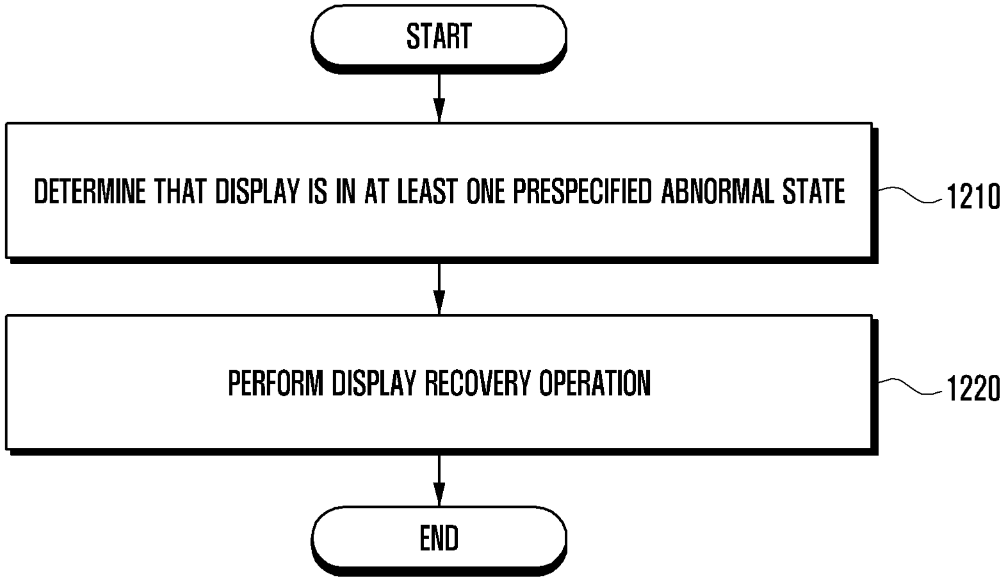
FIG. 12 is a flowchart illustrating an operation of an electronic device according to an embodiment of the disclosure.

FIG. 12 is a flowchart illustrating an operation of an electronic device according to an embodiment of the disclosure.

Referring to FIG. 12, it may be omitted. At least some operations mentioned with reference to other drawings in the disclosure may be further added before or after at least some of the operations illustrated in FIG. 12.

The operations illustrated in FIG. 12 may be performed by a processor 120 (e.g., the processor 120 of FIG. 1). For example, memory (e.g., the memory 130 of FIG. 1) of the electronic device 101 may store instructions that, when executed, cause the processor 120 to perform at least some of the operations illustrated in FIG. 12.

In operation 1210, the electronic device 101 according to an embodiment may monitor the state of a display 160 in a normal state. The processor 120 may control a PMIC 710 to apply an ELVDD voltage, which is a specified first voltage V1, and apply an ELVSS voltage, which is a specified second voltage V2, to the ELVSS line 502 in the normal state. The processor 120 may control a DDI 230 to apply a data voltage to a data line DL in the normal state. The processor 120 may determine whether the state of the display 160 is at least one prespecified abnormal state. The abnormal state may include a state in which the processor 120 detects an abnormal peak voltage from an external terminal of a display panel 310. The abnormal state may include a state in which the processor 120 detects an electrostatic discharge from at least a portion of the display panel 310.

In operation 1230, the electronic device 101 according to an embodiment may perform a recovery operation of the display 160 (e.g., a recovery operation of the display 160), based on the state of the display 160 being the at least prespecified abnormal state. The recovery operation of the display 160 is specifically described with reference to FIG. 13.

Figure 13:
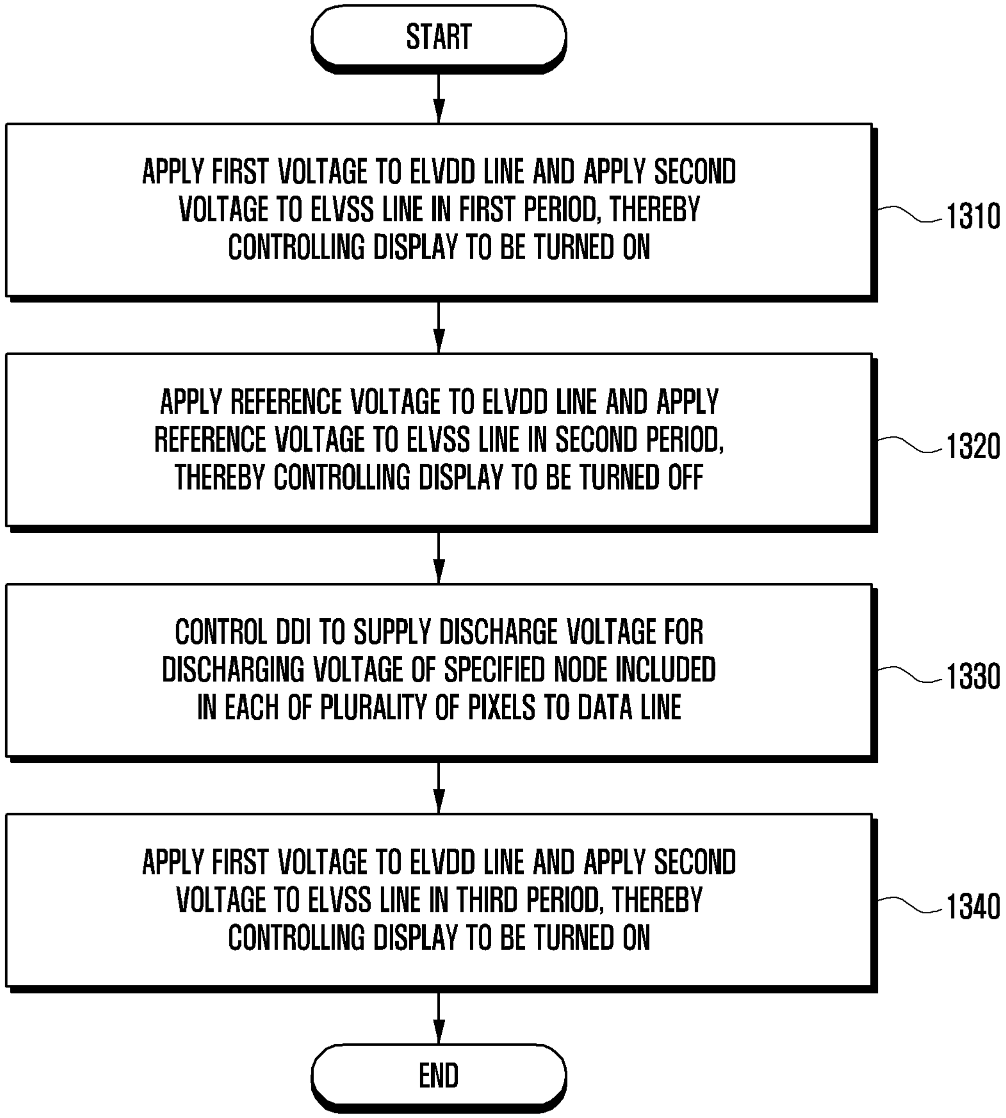
FIG. 13 is a flowchart illustrating an operation of recovering a display according to an embodiment of the disclosure.

FIG. 13 is a flowchart illustrating an operation of recovering a display according to an embodiment of the disclosure.

At least some of operations illustrated in FIG. 13 may be omitted. At least some operations mentioned with reference to other drawings in the disclosure may be further added before or after at least some of the operations illustrated in FIG. 13.

Referring to FIG. 13, the operations may be performed by a processor 120 (e.g., the processor 120 of FIG. 1). For example, memory (e.g., the memory 130 of FIG. 1) of the electronic device 101 may store instructions that, when executed, cause the processor 120 to perform at least some of the operations illustrated in FIG. 13.

In operation 1310, the electronic device 101 according to an embodiment may apply an ELVDD voltage, which is a specified first voltage V1, through an ELVDD line 501 and apply an ELVSS voltage, which is a specified second voltage V2, through an ELVSS line 502 in a first period 521, thereby controlling the display 160 to be turned on. The processor 120 may switch from the first period 521 to a second period 522, based on detecting an abnormal state in the first period 521.

In operation 1320, the electronic device 101 according to an embodiment may turn off the ELVDD voltage and the ELVSS voltage supplied to a display panel 310 in the second period 522. The processor 120 may apply a reference voltage VR to the ELVDD line 501 instead of the ELVDD voltage and apply the reference voltage VR to the ELVSS line 502 instead of the ELVSS voltage, thereby controlling the display 160 to be turned off. In the second period 522, the processor 120 may control the data voltage not to be supplied to the display 160, and accordingly the potential of a data line DL may be the reference voltage VR. The reference voltage VR mentioned in the disclosure may be a ground voltage. According to an embodiment of the disclosure, the processor 120 may maintain the second period 522 for a specified time, and may switch from the second period 522 to a third period 523 after maintaining the second period 522.

In operation 1330, the electronic device 101 according to an embodiment may control a DDI 230 to supply a discharge voltage Vdis for discharging the voltage of a specified node included in each of a plurality of pixels P to the data line DL. For example, the electronic device 101 may control the DDI 230 to supply the discharge voltage Vdis to each pixel P before the display 160 transitions from an off state to an on state. For example, the electronic device 101 according to the comparative example may control the DDI 230 to supply the discharge voltage Vdis to each pixel P in at least part of the second period 522 before switching from the second period 522 to the third period 523.

In operation 1340, the electronic device 101 according to an embodiment may apply the first voltage V1 to the ELVDD line 501 and the second voltage V2 to the ELVSS line 502 in the third period 523 in the third period 523, thereby controlling the display 160 to be turned on. According to an embodiment of the disclosure, when performing a recovery operation of the display panel 310, the electronic device 101 may control the DDI 230 to swap the discharge voltage Vdis supplied to the display 160 through the data line DL with an analog data voltage VB1 corresponding to a black grayscale when the display 160 transitions from the off state to the on state. For example, the electronic device 101 may apply the ELVDD voltage through the ELVDD line 501 and apply the ELVSS voltage through the ELVSS line 502 when switching from the second period 522 to the third period 523. The electronic device 101 may control the DDI 230 to swap the discharge voltage Vdis with the analog data voltage VB1 corresponding to the black grayscale and output the analog data voltage VB1 in synchronization with applying the ELVDD voltage through the ELVDD line 501 and applying the ELVSS voltage through the ELVSS line 502.

According to an embodiment of the disclosure, the discharge voltage Vdis may have a higher potential than an analog data voltage that the DDI 230 outputs to correspond to the black grayscale in a normal state (or the analog data voltage that the electronic device 101 according to the comparative examples of FIGS. 6 and 7 outputs when performing the recovery operation of the display panel 310) considering that the reference voltage other than the ELVDD voltage is applied to the ELVDD line 501.

An electronic device may include a display connected to an ELVDD line to which a specified first voltage is applied and an ELVSS line to which a specified second voltage is applied and including a plurality of pixels configured to output light corresponding to a data signal input through a data line, a DDI configured to drive the display, and a processor electrically connected to the display and the DDI, wherein the processor may be configured to determine whether the display is in at least one prespecified abnormal state, and perform a display recovery operation, based on determining that the display is in the abnormal state, the display recovery operation including an operation of transitioning the display from an on state to an off state and an operation of transitioning the display from the off state to the on state, and the processor may be configured to control the DDI to supply a discharge voltage for discharging a voltage of a specified node included in each of the plurality of pixels to the data line before the display transitions from the off state to the on state.

According to an embodiment of the disclosure, when performing the display recovery operation, the processor may be configured to control the display to be in the on state by applying the first voltage to the ELVDD line and applying the second voltage to the ELVSS line in a first period, and switch from the first period to a second period, based on detecting the abnormal state in the first period, control the display to be in the off state by applying a reference voltage to the ELVDD line and applying the reference voltage to the ELVSS line in the second period, and switch from the second period to a third period after maintaining the second period for a specified time, and control the display to be in the on state by applying the first voltage to the ELVDD line and applying the second voltage to the ELVSS line in the third period.

According to an embodiment of the disclosure, the DDI may be configured to supply the discharge voltage to the data line, based on control of the processor, before the second period switches to the third period.

According to an embodiment of the disclosure, the DDI may be configured to change a voltage supplied to the data line from the discharge voltage to an analog data voltage corresponding to a black grayscale in response to the second period switching to the third period, based on control of the processor.

According to an embodiment of the disclosure, a potential of the discharge voltage may be different from a potential of the analog data voltage corresponding to the black grayscale.

According to an embodiment of the disclosure, the potential of the discharge voltage may be higher than the potential of the analog data voltage corresponding to the black grayscale.

According to an embodiment of the disclosure, the DDI may include a gamma voltage generation unit configured to generate a gamma voltage, a decoder unit configured to change a digital data signal input from the processor into an analog data signal by using the gamma voltage, a buffer unit configured to supply the analog data signal output from the decoder unit to the data line, and a discharge voltage generation unit configured to supply the discharge voltage to the decoder unit when the display recovery operation is performed.

According to an embodiment of the disclosure, the at least one abnormal state may include at least one of a state in which an abnormal peak voltage is detected from an external terminal of a display panel and a state in which an electrostatic discharge is detected from at least a portion of the display panel.

According to an embodiment of the disclosure, the discharge voltage may be a voltage enabling the plurality of pixels to display a black grayscale when the reference voltage is applied to the ELVDD line.

According to an embodiment of the disclosure, the reference voltage may be a ground voltage.

A method of an electronic device may include determining whether a display is in at least one prespecified abnormal state; and performing a display recovery operation, based on determining that the display is in the abnormal state, the display recovery operation including an operation of transitioning the display from an on state to an off state and an operation of transitioning the display from the off state to the on state, wherein a DDI may be controlled to supply a discharge voltage for discharging a voltage of a specified node included in each of the plurality of pixels to a data line of the display before the display transitions from the off state to the on state.

According to an embodiment of the disclosure, the display recovery operation may include controlling the display to be in the on state by applying a prespecified first voltage to an ELVDD line and applying a prespecified second voltage to an ELVSS line in a first period, and switching from the first period to a second period, based on detecting the abnormal state in the first period, controlling the display to be in the off state by applying a reference voltage to the ELVDD line and applying the reference voltage to the ELVSS line in the second period, and switching from the second period to a third period after maintaining the second period for a specified time, and controlling the display to be in the on state by applying the first voltage to the ELVDD line and applying the second voltage to the ELVSS line in the third period.

According to an embodiment of the disclosure, the method may further include supplying the discharge voltage to the data line before the second period switches to the third period, by controlling the DDI.

According to an embodiment of the disclosure, the method may further include changing a voltage supplied to the data line from the discharge voltage to an analog data voltage corresponding to a black grayscale in response to the second period switching to the third period, by controlling the DDI.

According to an embodiment of the disclosure, a potential of the discharge voltage may be different from a potential of the analog data voltage corresponding to the black grayscale.

According to an embodiment of the disclosure, the potential of the discharge voltage may be higher than the potential of the analog data voltage corresponding to the black grayscale.

According to an embodiment of the disclosure, the DDI may include a gamma voltage generation unit configured to generate a gamma voltage, a decoder unit configured to change a digital data signal input from the processor into an analog data signal by using the gamma voltage, a buffer unit configured to supply the analog data signal output from the decoder unit to the data line, and a discharge voltage generation unit configured to supply the discharge voltage to the decoder unit when the display recovery operation is performed.

According to an embodiment of the disclosure, the at least one abnormal state may include at least one of a state in which an abnormal peak voltage is detected from an external terminal of a display panel and a state in which an electrostatic discharge is detected from at least a portion of the display panel.

According to an embodiment of the disclosure, the discharge voltage may be a voltage enabling the plurality of pixels to display a black grayscale when the reference voltage is applied to the ELVDD line.

According to an embodiment of the disclosure, the reference voltage may be a ground voltage.

A recording medium may store instructions readable by a processor of an electronic device, and the instructions may, when executed by the processor, determine whether a display is in at least one prespecified abnormal state. The instructions may perform a display recovery operation, based on determining that the display is in the abnormal state. The display recovery operation by the instructions may include an operation of transitioning the display from an on state to an off state. The display recovery operation by the instructions may include an operation of transitioning the display from the off state to the on state. The display recovery operation by the instructions may control the DDI to supply a discharge voltage for discharging a voltage of a specified node included in each of the plurality of pixels to a data line of the display before the display transitions from the off state to the on state.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display including a plurality of pixels connected to an electroluminescent voltage drain drain (ELVDD) line to which a specified first voltage is applied and an electroluminescent voltage source source (ELVSS) line to which a specified second voltage is applied, wherein the plurality of pixels are configured to output light corresponding to a data signal input through a data line;

a device driver integrated circuit (IC) (DDI) configured to drive the display;

memory storing one or more computer programs; and one or more processors communicatively coupled to the memory, the display, and the DDI, wherein the one or more computer programs include computer-executable instructions that, when executed by the one or more processors individually or collectively, cause the electronic device to:

determine whether the display is in at least one prespecified abnormal state, and perform a display recovery operation, based on determining that the display is in the abnormal state, the display recovery operation comprising an operation of transitioning the display from an on state to an off state and an operation of transitioning the display from the off state to the on state, and wherein, while the display is in the off state, the processor is configured to:

supply a ground voltage to the ELVDD line and the ELVSS line, and control the DDI to supply a discharge voltage for discharging a voltage of a specified node included in each of the plurality of pixels to the data line before the display transitions from the off state to the on state, the discharge voltage being a voltage set to cause the plurality of pixels to display a black grayscale while the ground voltage is applied to the ELVDD line and the ELVSS line.

2. The electronic device of claim 1, wherein the one or more computer programs further include computer-executable instructions that, when executed by the one or more processors individually or collectively, cause the electronic device to, in case of performing the display recovery operation:

control the display to be in the on state by applying the first voltage to the ELVDD line and applying the second voltage to the ELVSS line in a first period, and switch from the first period to a second period, based on detecting the abnormal state in the first period, control the display to be in the off state by applying a reference voltage to the ELVDD line and applying the reference voltage to the ELVSS line in the second period, and switch from the second period to a third period after maintaining the second period for a specified time, and control the display to be in the on state by applying the first voltage to the ELVDD line and applying the second voltage to the ELVSS line in the third period.

3. The electronic device of claim 2, wherein the DDI is configured to supply the discharge voltage to the data line, based on control of the processor, before the second period switches to the third period.

4. The electronic device of claim 3, wherein the DDI is configured to, based on control of the processor, in response to the second period switching to the third period, change a voltage supplied to the data line from the discharge voltage to an analog data voltage corresponding to a black grayscale.

5. The electronic device of claim 4, wherein a potential of the discharge voltage is different from a potential of the analog data voltage corresponding to the black grayscale.

6. The electronic device of claim 5, wherein the potential of the discharge voltage is higher than the potential of the analog data voltage corresponding to the black grayscale.

7. The electronic device of claim 3, wherein the DDI comprises:

a gamma voltage generation unit configured to generate a gamma voltage;

a decoder unit configured to change a digital data signal input from the processor into an analog data signal by using the gamma voltage;

a buffer unit configured to supply the analog data signal output from the decoder unit to the data line; and a discharge voltage generation unit configured to supply the discharge voltage to the decoder unit in case that the display recovery operation is performed.

8. The electronic device of claim 2, wherein the discharge voltage is a voltage enabling the plurality of pixels to display a black grayscale in case that the reference voltage is applied to the ELVDD line.

9. The electronic device of claim 2, wherein the reference voltage is a ground voltage.

10. The electronic device of claim 1, wherein the at least one abnormal state comprises at least one of a state in which an abnormal peak voltage is detected from an external terminal of a display panel and a state in which an electrostatic discharge is detected from at least a portion of the display panel.

11. The electronic device of claim 1, wherein the DDI comprises:

a source driver, a charge pump, and a discharge voltage generation unit, wherein the DDI receives a first power and a second power, wherein the first power is provided by the DDI to the source driver and the discharge voltage generation unit and the second power is provided by the DDI to the charge pump.

12. A method of an electronic device, the method comprising:

determining whether a display including a plurality of pixels is in at least one prespecified abnormal state; and performing a display recovery operation, based on determining that the display is in the abnormal state, the display recovery operation comprising an operation of transitioning the display from an on state to an off state and an operation of transitioning the display from the off state to the on state, wherein the display is connected to an electroluminescent voltage drain drain (ELVDD) line to which a specified first voltage is applied and an electroluminescent voltage source source (ELVSS) line to which a specified second voltage is applied, wherein the plurality of pixels are configured to output light corresponding to a data signal input through a data line, and wherein, while the display is in the off state, the method further comprises:

supplying a ground voltage to the ELVDD line and the ELVSS line, and controlling a device driver integrated circuit (IC) (DDI) to supply a discharge voltage for discharging a voltage of a specified node included in each of the plurality of pixels to a data line of the display before the display transitions from the off state to the on state, the discharge voltage being a voltage set to cause the plurality of pixels to display a black grayscale while the ground voltage is applied to the ELVDD line and the ELVSS line.

13. The method of claim 12, wherein the display recovery operation comprises:

controlling the display to be in the on state by applying a prespecified first voltage to the ELVDD line and applying a prespecified second voltage to the ELVSS line in a first period, and switching from the first period to a second period, based on detecting the abnormal state in the first period;

controlling the display to be in the off state by applying a reference voltage to the ELVDD line and applying the reference voltage to an electroluminescent voltage source source (ELVSS) line in the second period, and switching from the second period to a third period after maintaining the second period for a specified time; and controlling the display to be in the on state by applying the first voltage to the ELVDD line and applying the second voltage to the ELVSS line in the third period.

14. The method of claim 13, further comprising:

supplying the discharge voltage to the data line before the second period switches to the third period, by controlling the DDI.

15. The method of claim 14, further comprising:

changing a voltage supplied to the data line from the discharge voltage to an analog data voltage corresponding to a black grayscale in response to the second period switching to the third period, by controlling the DDI.

16. The method of claim 15, wherein a potential of the discharge voltage is different from a potential of the analog data voltage corresponding to the black grayscale.

17. The method of claim 16, wherein the potential of the discharge voltage is higher than the potential of the analog data voltage corresponding to the black grayscale.

18. The method of claim 14, further comprising:

generating, by a gamma voltage generation unit, a gamma voltage;

changing, by a decoder unit, a digital data signal input from a processor into an analog data signal by using the gamma voltage;

supplying, by a buffer unit, the analog data signal output from the decoder unit to the data line; and supplying, by a discharge voltage generation unit, the discharge voltage to the decoder unit in case that the display recovery operation is performed.

19. The method of claim 12, wherein the at least one abnormal state comprises at least one of a state in which an abnormal peak voltage is detected from an external terminal of a display panel and a state in which an electrostatic discharge is detected from at least a portion of the display panel.

20. One or more non-transitory computer-readable storage media storing computer-executable instructions that, when executed by a processor individually or collectively, cause an electronic device to perform operations, the operations comprising:

determining whether a display including a plurality of pixels is in at least one prespecified abnormal state; and performing a display recovery operation, based on determining that the display is in the abnormal state, the display recovery operation comprising an operation of transitioning the display from an on state to an off state and an operation of transitioning the display from the off state to the on state, wherein the display is connected to an electroluminescent voltage drain drain (ELVDD) line to which a specified first voltage is applied and an electroluminescent voltage source source (ELVSS) line to which a specified second voltage is applied, wherein the plurality of pixels are configured to output light corresponding to a data signal input through a data line, and wherein, while the display is in the off state, the operations further comprise:

supplying a ground voltage to the ELVDD line and the ELVSS line, and controlling a device driver integrated circuit (IC) (DDI) is controlled to supply a discharge voltage for discharging a voltage of a specified node included in each of the plurality of pixels to a data line of the display before the display transitions from the off state to the on state, the discharge voltage being a voltage set to cause the plurality of pixels to display a black grayscale while the ground voltage is applied to the ELVDD line and the ELVSS line.

21. The one or more non-transitory computer-readable storage media of claim 20, the operations further comprising:

controlling the display to be in the on state by applying a prespecified first voltage to the ELVDD line and applying a prespecified second voltage to the ELVSS line in a first period, and switching from the first period to a second period, based on detecting the abnormal state in the first period;

controlling the display to be in the off state by applying a reference voltage to the ELVDD line and applying the reference voltage to an electroluminescent voltage source source (ELVSS) line in the second period, and switching from the second period to a third period after maintaining the second period for a specified time; and controlling the display to be in the on state by applying the first voltage to the ELVDD line and applying the second voltage to the ELVSS line in the third period.

* * * * *